United States Patent [19]
Yamashita et al.

[11] Patent Number: 5,782,223
[45] Date of Patent: Jul. 21, 1998

[54] FUEL SUPPLY SYSTEM

[75] Inventors: Keiichi Yamashita; Kouji Izutani; Kingo Okada; Hideto Takahashi, all of Kariya, Japan

[73] Assignee: Nippondenso Co., Ltd., Kariya, Japan

[21] Appl. No.: 694,069

[22] Filed: Aug. 8, 1996

Related U.S. Application Data

[63] Continuation of PCT/JP95/02239 Nov. 2, 1995.

[30] Foreign Application Priority Data

Feb. 3, 1995 [JP] Japan ................................. 7-017308

[51] Int. Cl.[6] ........................................ F02M 37/04
[52] U.S. Cl. ................................. 123/510; 123/509
[58] Field of Search ........................ 123/509, 510, 123/514; 417/360; 137/565, 571

[56] References Cited

U.S. PATENT DOCUMENTS

| | | | |
|---|---|---|---|
| 4,546,750 | 10/1985 | Brunell | 123/509 |
| 5,050,567 | 9/1991 | Suzuki | 123/509 |
| 5,080,077 | 1/1992 | Sawert | 123/509 |
| 5,186,152 | 2/1993 | Cortocuiato | 123/510 |
| 5,363,827 | 11/1994 | Siermann | 123/509 |
| 5,452,701 | 9/1995 | Tuckey | 123/509 |
| 5,560,342 | 10/1996 | Fournier | 123/509 |
| 5,564,396 | 10/1996 | Kleppner | 123/509 |
| 5,593,287 | 1/1997 | Sadakata | 123/509 |
| 5,613,476 | 3/1997 | Oi | 123/509 |
| 5,613,844 | 3/1997 | Tuckey | 123/509 |

*Primary Examiner*—Carl S. Miller
*Attorney, Agent, or Firm*—Nixon & Vanderhye P.C.

[57] ABSTRACT

A fuel supply system is installed inside a fuel tank as part of a cover closing an opening of the fuel tank. The fuel filter is integrally fixed to the cover and a fuel pump is mounted via the fuel filter. The fuel filter is in the shape of a partial annulus disposed in a certain angular range. Such system parts as a pressure regulator, an electric connector, a fuel level gauge and a fuel pipe are contained in the remaining angular range of the fuel pump periphery where the fuel filter is not disposed.

24 Claims, 5 Drawing Sheets

FUEL SUPPLY SYSTEM

SPECIFICATION

TECHNICAL FIELD

The present invention relates to a fuel supply system which delivers fuel to a fuel consumption unit such as an internal combustion engine or the like.

BACKGROUND ART

A system as disclosed in U.S. Pat. No. 5,392,750 has been widely known as a fuel supply system delivering fuel to an internal combustion engine. In U.S. Pat. No. 5,392,750, an annular fuel filter is disposed around the outer periphery of a fuel pump to constitute a fuel supply device.

U.S. Pat. No. 5,195,494 has also proposed that a plurality of fuel system parts such as a fuel pump and a fuel filter should be united so as to contain them inside a fuel tank.

However, in U.S. Pat. No. 5,392,750, because the fuel filter occupies all the area around the outer periphery of the fuel pump, in case the other fuel system parts are integrally disposed, they have to be disposed more outwardly in the radial direction or along the axial direction, which causes problems as the body of the entire system becomes larger.

In case fuel system parts are so designed as to be inserted through an opening of the fuel tank to construct a united system as disclosed particularly in U.S. Pat. No. 5,195,494, a larger-sized unit needs a larger fuel tank opening, which causes deterioration of fuel tank rigidity as well as to increase the required sealing circumference. Furthermore, where fuel system parts are inserted through an opening of a fuel tank requires those parts to be substantially the same assembled shape as the opening; however, such disposition of the parts has been difficult using conventional technology.

DISCLOSURE OF THE INVENTION

In light of the problem in the above-described conventional technology, the present invention has an object of providing an improved fuel supply system.

The present invention has another object of uniting all the fuel supply system parts including a fuel pump, a fuel filter and the other parts in a compact body.

The object of the present invention can be achieved by employing, in a fuel supply system delivering fuel to a fuel consumption unit, a fuel pump having a cylindrical appearance, a fuel filter filtering the fuel delivered to a fuel consumption unit and having a shape surrounding the outer periphery of a fuel pump, parts other than the fuel pump and the fuel filter constructing the fuel supply system, and a holding member holding a plurality of parts for the fuel supply system, holding the fuel pump, and also holding the fuel filter around the outer periphery of the fuel pump windingly and furthermore holding the other parts around the outer periphery of the fuel pump at a position overlapping along the peripheral direction of the fuel pump with respect to the fuel filter.

Since the fuel filter and the other parts are held in an overlapped condition around the peripheral direction of the outer periphery of the fuel pump according to this arrangement, the fuel supply system including the fuel pump, the fuel filter, and the other parts can be integrated with each other at a high density.

It is preferred that the fuel filter is part-annularly formed to have a non-continuous annulus partly over a certain angular range around the outer periphery of the fuel pump so that the other parts may be held in this non-continuous portion.

The other parts include a pressure regulator, a fuel passage, a jet pump, an electric connector passing through a cover closing an opening of the fuel tank or a fuel level gauge for detecting fuel level inside the fuel tank.

It is preferred that the fuel supply system should be installed inside the fuel tank and held by the cover closing the opening of the fuel tank.

The object of the present invention is also achieved by employing, in a holding unit of a fuel supply system holding a plurality of parts of the fuel supply system including a fuel pump and a fuel filter inside a fuel tank, a cylindrical fuel pump holding portion for holding the fuel pump, a parts-holding portion formed around the outer periphery of the fuel pump, wherein the parts-holding portion is divided into a first holding region holding the fuel filter disposed along the peripheral direction and a second holding region disposed adjacent to said first holding region along the peripheral direction as well as holding the other parts.

It is preferred that the holding unit of the fuel supply system has a cover closing an opening of the fuel tank.

The other parts include a fuel level gauge detecting a fuel level inside the fuel tank, a pressure regulator, an electric connector, and a member forming a fuel passage or a jet pump.

BEST MODES FOR PRACTICING THE INVENTION

The preferred embodiments of the present invention are hereinafter described with reference to the accompanying drawings.

First Embodiment

Figure 1:
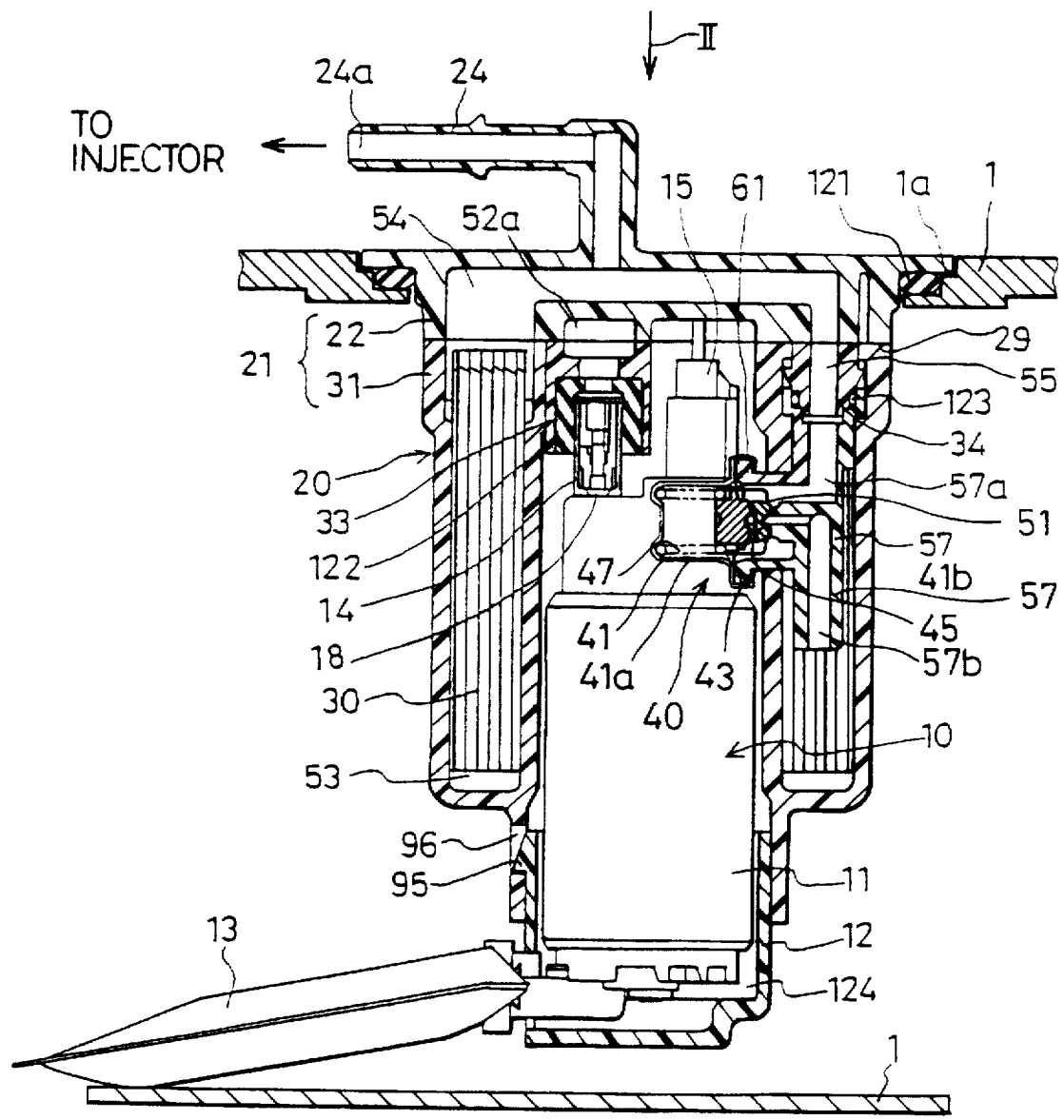
FIG. 1 is a longitudinal cross-sectional view of a first embodiment according to the present invention.
Figure 2:
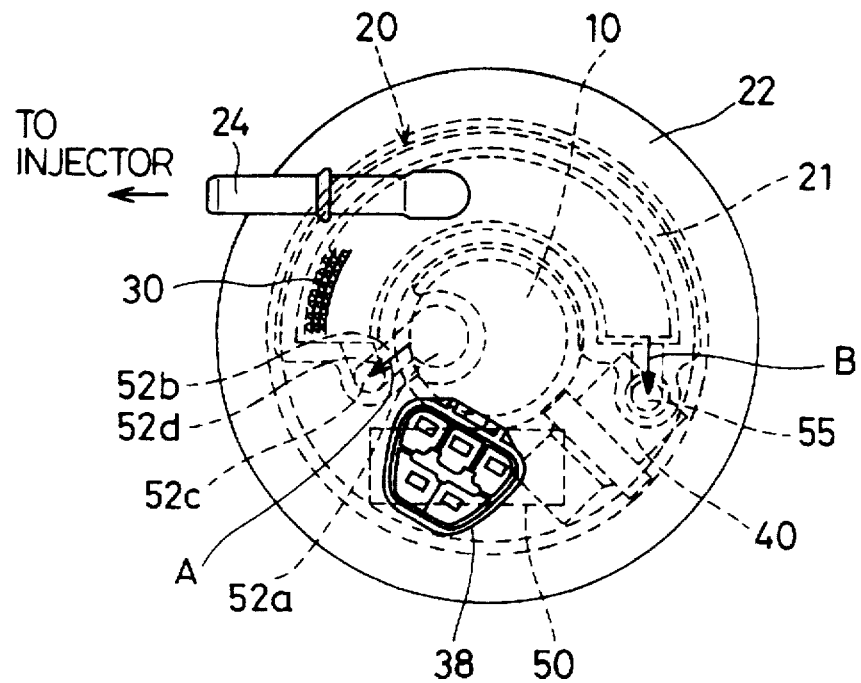
FIG. 2 is a view taken along the arrow II in FIG. 1.

FIGS. 1 and 2 show a fuel supply system according to a first embodiment of the present invention.

As shown in FIGS. 1 and 2, a fuel pump 10, a fuel filter 20, an electric connector 38, a pressure regulator 40, a fuel level gauge 50 and other functional parts are disposed inside a fuel tank 1 through the opening disposed on an upper wall of the fuel tank 1.

The constructional arrangement of the parts constituting the fuel supply system as viewed from the top is illustrated in FIG. 2.

The fuel pump 10 is disposed at the central axial portion of a cylindrical unit and the fuel filter 20 in the shape of a letter C is disposed in a range of substantially semicircle around the outer periphery of the fuel pump 10. In a space on the opposite side where the fuel filter 20 around the fuel pump 10 is not disposed, the electric connector 38, a fuel passage pipe 52c, a fuel passage pipe 55, a fuel level gauge 50 and a pressure regulator 40 are disposed. The fuel level gauge 50 is disposed below the pressure regulator 40 shown in FIG. 1.

In this way, various functional parts can be disposed and arranged compactly in a cylindrical shape in an allowable range of the depth of the fuel tank by utilizing the space around the nearly-filled cylindrical-shaped fuel pump 10, which improves working performance when the unit of the fuel supply system is mounted on the fuel tank. A suction filter 13 and a float of the fuel level gauge 50 extend from the cylindrical unit.

On the other hand, as for the arrangement of the fuel pump 10, fuel filter 20, and the pressure regulator 40, as shown in FIG. 1 as viewed from the side, the fuel pump 10 is disposed inside a pump case 12 engaged with a lower end portion of a filter case 21 and the fuel filter 20 in the shape of a half-divided cylinder is disposed at the upper portion than the middle of the fuel pump 10. Accordingly, the lower portion of the fuel filter 20 is disposed not in alignment with the axial direction of the fuel pump 10 but in the partially overlapping direction with the fuel pump 10 in the axial direction of the fuel pump 10 when viewed from the side. Thus, the length of the pump in the axial direction, i.e., the height in the depth direction of the fuel tank is shortened, and a compact appearance of the fuel supply system including highly-integrated functional parts is provided.

A click (i.e., tongue) 95 of the pump case 12 containing the pump body 11 of the fuel pump 10 can be snap-fitted to a hole 96 of a filter case 21 so that the pump body 11 can be easily removed from the pump case 12 by removing the pump case 12 from the filter case 21. The pump body 11 floats by an upper rubber member 122 and a lower rubber member 124 and is supported and fixed by the pump case 12 and the filter case 21. Foreign substances in the fuel in the fuel tank 1 sucked by the pump body 11 are first removed by the filter 13. The fuel delivered from the pump body 11 to the fuel filter 20 is adjusted to a predetermined pressure by the pressure regulator 40. Foreign substances in the fuel are removed further by the fuel filter 20 and the fuel is supplied from a fuel discharging pipe 24 to an injector not shown in the Figure.

The fuel filter 20 is removably mounted on the fuel pump 10 and the pressure regulator 40. The filter case 21 is annularly molded by resin and forms a container for containing an element 30 only in a range with a certain angle. The sectional shape of this container crossing the axis of the fuel pump 10 at right angles is that of a letter C. The filter case 21 includes an upper case 22 and a lower case 31, both of which are welded at a boundary portion 29. Although the lower case 31 forms a container in the shape of a letter C in its cross-section, it also has a wall along the outer periphery of the fuel pump 10 at the opening of the letter C portion. This wall has a hole 96 and includes a portion of a supporting portion of the fuel pump 10. Furthermore, the fuel level gauge 50 is supported by this wall.

The upper case 22 of the filter case 21 as a whole is made of insulating resin whereas the lower case 31 is made of resin including conductive material such as carbon fibers or carbon powder or the like, so that it has electric conductivity. The lower case 31 conducts to the metal case of the fuel pump body 11 in the present embodiment; however, it is not connected to the fuel tank 1 and a vehicle body on which the fuel tank 1 is installed. The lower case 31 may be grounded by electrical connection to the vehicle.

The fuel filter 20 is fixed to the fuel tank 1 by engaging the peripheral portion of the upper case 22 as a cover with a groove 1a formed on the peripheral portion of the upper wall opening of the fuel tank 1 via a gasket 121. As for the fuel filter 20, the filter case 21 has one fuel inlet and two fuel outlets. The suction pipe 33 forming the fuel inlet is connected to the discharging pipe 14 of the pump body 11. The fuel discharging pipe 24 forming a first fuel outlet of the two fuel outlets supplies the fuel to the injector after removing foreign substances using the filter element 30. A return pipe 34 forming the other fuel outlet, i.e., a second fuel outlet, is connected to the pressure regulator 40 for maintaining the pressure of fuel supplied to the injector.

As shown in FIG. 2, the electric connector 38 is placed above the upper case 22 and at a position not overlapping the semi-cylindrical fuel filter 20 when viewed from the top. The terminal of this electric connector 38 is electrically connected to an electric connector of the fuel pump 10 via a lead wire not shown in the Figure and supplies electric power to the motor, not shown, but driving the pump body 11.

As shown in FIG. 1, the rubber member 122 seals both the outer peripheral wall of the discharging pipe 14 disposed above the pump body 11 and the inner wall of the fuel suction pipe 33 of the fuel filter 20. Thus, the discharging pipe 14 and the fuel suction pipe 33 do not have to be tightly engaged with each other, which contributes to simple processing of the discharging pipe 14 and the fuel suction pipe 33 and also to easy removal of the fuel pump 10 from the fuel filter 20. A check valve 18 is held within the discharging pipe 14. The check valve 18 prevents counterflow of the fuel discharged from the discharging pipe 14 to the pump body 11 and also maintains fuel residual pressure inside the fuel pipe when the pump body 11 is turned off.

The pressure regulator 40 is fixed to a pressure regulator fixing portion 61 of a pipe 57 fitted with the return pipe 34 via an O-ring 123. This enables the pressure regulator 40 to be easily removed from the filter case 21 by removing the pipe 57 from the return pipe 34. The edge of a pressure regulator housing 41 is caulked and fixed to the pressure regulator fixing portion 61 so as to fasten and support the outer periphery of the diaphragm 43 by the edge of the pressure regulator housing 41 and the pressure regulator fixing portion 61. A ventilation hole 41a is formed in the pressure regulator housing 41 for setting a pressure in the spring chamber 41b of the pressure regulator housing 41 at the atmospheric pressure or a tank interior pressure. A valve body 51 fixed to the diaphragm 43 is biased toward a seat member 45 by the biasing force of a compressed coil spring 47.

The flow of the fuel is hereinafter explained.

The fuel, sucked by the fuel pump 10 and discharged from the discharging pipe 14 after passing through the inside of the pump via the fuel pump suction inlet from the filter 13, flows in the arrow direction A in FIG. 2, i.e., from passage 52a inside the upper case 22 to passage 52b. After the fuel further goes downward to be led to a filter inlet chamber 53 from a passage 52d and passes into passage 54 via the filter element 30, a portion of the fuel is delivered to the injector from the discharging passage inside the fuel discharging pipe 24. The residual portion of the fuel flows into passage 55 of the return pipe 34 in the arrow direction B in FIG. 2 to be delivered into the fuel tank 1 via inlet passage 57a of pipe 57, the pressure regulator 40, and an outlet passage 57b. The pressure inside the passage 54 is adjusted by the pressure regulator 40. When the pressure exceeds a predetermined pressure, excess fuel returns from the pressure regulator 40 to inside the fuel tank 1 via the passage inside the pipe 57.

As for the operation of the fuel supply system, when the pressure of the fuel led to the passage 57a via the filter element 30 and the passages 54 and 56 exceeds a spring set pressure, the diaphragm 43 in the pressure regulator 40 moves toward the spring chamber 41b by countering the spring force of the compressed coil spring 47. At that time, the valve body 51 moves with the diaphragm 43 and lifts away from the seat member 45, so that the fuel inside the inlet passage 57a of the pipe 57 returns to the fuel tank 1 from the outlet passage 57b. Because the diaphragm 43 moves to a position where the spring force of the compressed coil spring 47 and the force received by the fuel pressure in the inlet passage 57a balance, to adjust the discharging volume of the fuel from the outlet passage 57b, a fuel pressure supplied to the injector from the fuel filter 20 can be maintained at a predetermined pressure.

According to the present embodiment, the partially annular fuel filter 20 is disposed concentric with the axis of the fuel pump 10 when viewed from the top of the fuel pump 10. Because such functional parts as the electric connector 38, the pressure regulator 40, the pressure level gauge 50 and the like are disposed within the residual partially annular space where the fuel filter 20 is not disposed, the present embodiment effectively shortens the length of the fuel supply system in the pump's axial direction, i.e., the length of the system in the depth direction of the fuel tank. In the above-described embodiment, the container 31 in the cross-sectional shape of the letter C is fixed to the cover 22 in order to construct the partially annular fuel filter 20 and contains the filter element 30 therein. Whereas the fuel pump body 11 is disposed at the inner periphery of the container 31, the other parts including the pressure regulator 40 are disposed in the opened space of the letter C-shaped container.

By integrating various formerly dispersively disposed functional parts with each other in the axial direction of the fuel pump 10 and in the space around the pump axis as described above, a substantially cylindrical fuel supply system can be constructed which effectively makes the fuel supply system itself small and compact.

Furthermore, in the present embodiment, the fuel filter 20 and the pressure regulator 40 are exchangeably arranged. Since the pressure regulator 40 is disposed in the fuel tank 1 with the one-way fuel pipe only for delivering the fuel from the fuel tank 1 to the engine, the fuel heated in the vicinity of the engine does not return to the fuel tank 1 again as excess fuel. Accordingly, because excess fuel can be returned inside the fuel tank 1, the temperature of the fuel is prevented from rising and generation of fuel vapor or bubbles in the fuel can be also suppressed.

Thus, in the present embodiment, the fuel filter and the pressure regulator overlap around the outer periphery of the fuel pump along the peripheral direction thereof. Similarly, the fuel filter and the fuel level gauge as well as the fuel filter and the electric connector and the fuel filter and the fuel passage overlap around the outer periphery of the fuel pump along the peripheral direction.

Second Embodiment

Figure 3:
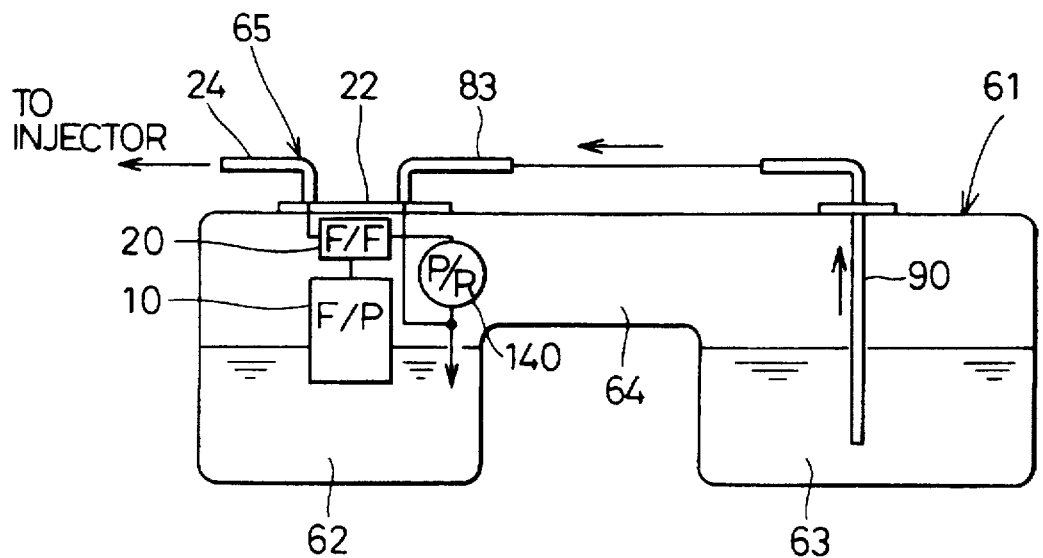
FIG. 3 is a structural view showing a fuel tank according to a second embodiment of the present invention and a fuel supply system mounted on a tank.
Figure 4:
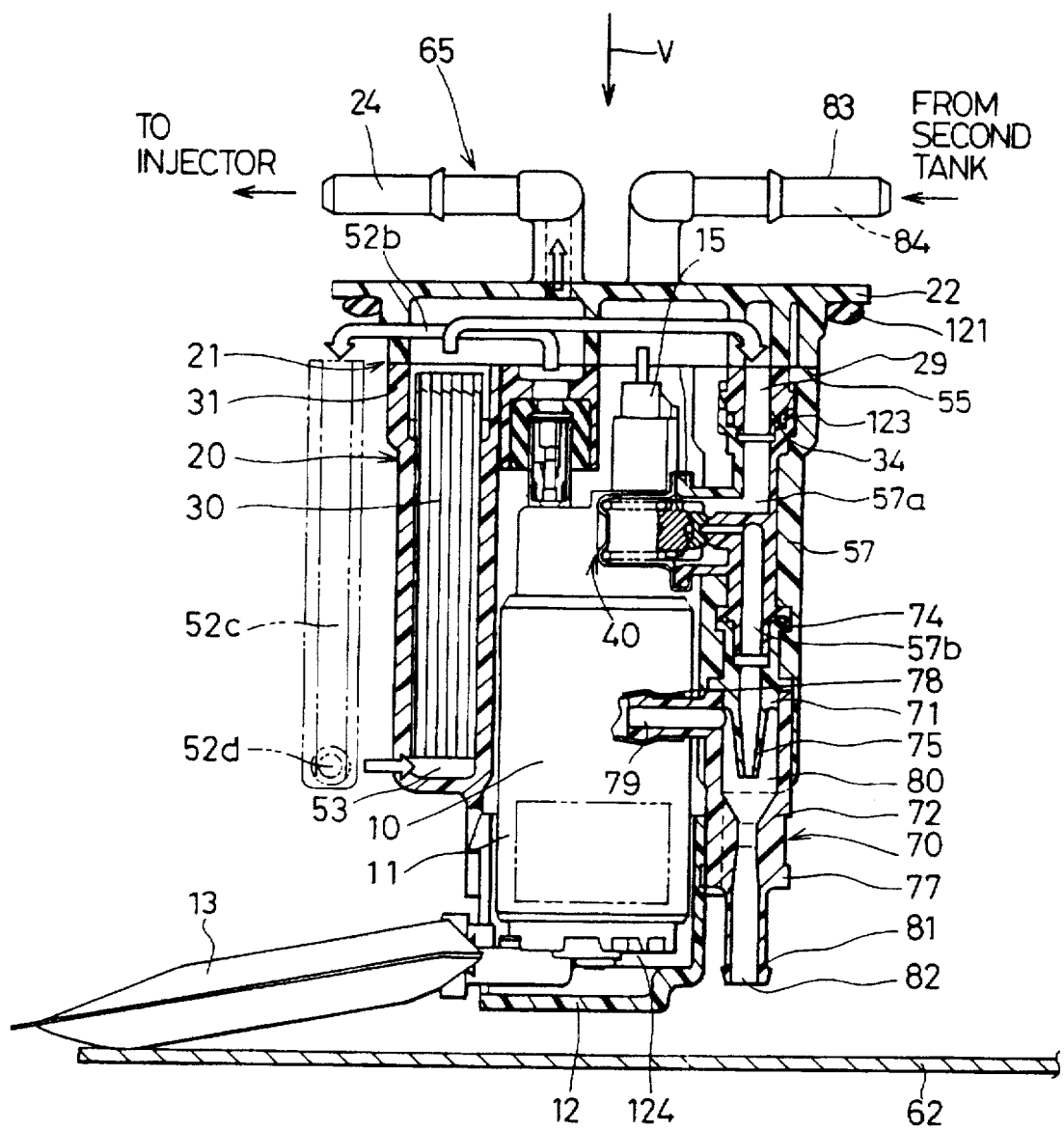
FIG. 4 is a longitudinal cross-sectional view in the second embodiment of the present invention.
Figure 5:
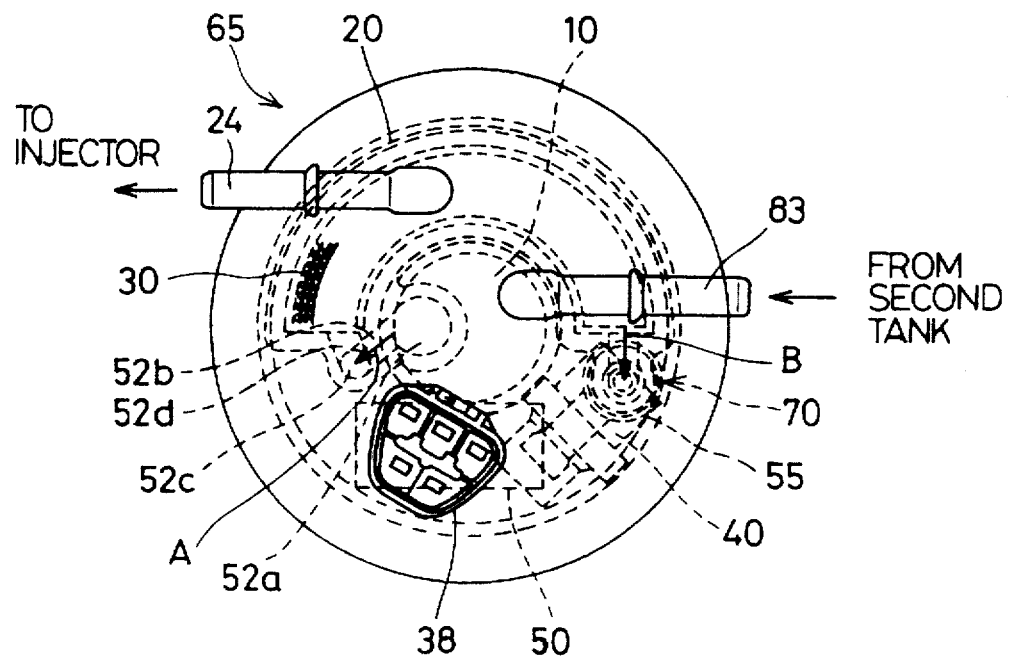
FIG. 5 is a view taken along the arrow V in FIG. 4.

FIGS. 3, 4, and 5 show a second embodiment of the present invention.

The second embodiment is an example of a fuel supply system of the present invention inside a fuel tank in the shape of a saddle installed in a four-wheel-drive vehicle.

As shown in FIG. 3, a saddle shaped fuel tank 61, straddling such parts as an axle shaft and a differential gear or the like, is installed in a vehicle in an inverted U-shape when viewed from the front part of the vehicle.

The saddle shaped fuel tank 61 is divided into a first tank 62 and a second tank 63 located at right and left sides of the vehicle, respectively. The first tank 62 and second tank 63 communicate with each other via an upper communicating pipe 64. The present embodiment disposes a fuel supply system 65 according to the present invention inside the first tank 62. The fuel supply system 65 disposed inside the first tank 62 is hereinafter described with reference to FIGS. 4 and 5.

As shown in FIGS. 4 and 5, a jet pump 70 is mounted on the fuel supply system of the first embodiment shown in FIGS. 1 and 2.

The jet pump 70 is composed of an injection nozzle 71 and a diffuser 72 fixed to the top of the injection nozzle 71. It is disposed and constructed by effectively utilizing a space where it does not overlap with the fuel filter 20 at a portion of the outer periphery of the fuel pump 10 as shown in FIG. 5 when viewed from the top.

An upper cylindrical supplying portion 74 of the injection nozzle 71 is fitted with the outer periphery of the pipe 57 whereas the inner passage of a lower hollow conical injecting portion 75 is tapered. The diffuser body 77 of the diffuser 72 is fixed in order to form a space around the tapered injecting portion 75. The diffuser body 77 has a pressure chamber 80 corresponding to the space therein. The pressure chamber 80 has a suction pipe 78 having a suction inlet 79 communicating with the pressure chamber 80 at one side and a discharging pipe 81 having a discharging outlet 82 communicating with the pressure chamber 80 at the other side. The suction inlet 79 communicates with a suction inlet 84 inside a suction pipe 63 communicating with the second tank 83. The suction passage 84 inside the suction pipe 83 communicates with a passage inside a suction pipe 90 in the second tank 63 as shown in FIG. 3.

According to this second embodiment, when the excess fuel discharged from the outlet passage 57b of the pipe 57 after passing through the pressure regulator 40 is injected from the injecting portion 75 of the injection nozzle 71, the fuel in the second tank 63 is sucked by negative pressure generated in the pressure chamber 80 via the suction pipe 90, the suction pipe 83 and the suction inlet 79 of the suction pipe 78 and is delivered to the first tank 62 from the discharging outlet 82 of the discharging pipe 81, so that the fuel inside the first tank 62 where the fuel pump 10 sucks the fuel does not become insufficient.

In the second embodiment, not only can the fuel pump 10 contained inside the first tank 62 of the fuel tank 61, the fuel filter 20 and the pressure regulator 40 be made highly-integrated and compact, but also utilization of the negative pressure generated by the jet current of the excess fuel discharged from the pressure regulator 40 can effectively suck the fuel inside the second tank 63, i.e., a different tank from the first tank 62 where the fuel pump 10 sucks the fuel and delivers it to the first tank 62.

Still further, the fuel can be sucked and delivered from the second tank 63, which is one part of the fuel tank shaped like a saddle from the constraints of the installing space of the fuel tank mounted in the vehicle, to the first or the other tank 62 having the fuel pump. This effectively prevents the insufficiency of the fuel sucked by the fuel pump.

Thus, in the present embodiment, the fuel filter and the pressure regulator overlap along the peripheral direction around the outer periphery of the fuel pump. Similarly, the fuel filter and the fuel level gauge, the fuel filter and the electric connector, the fuel filter and the electric connector, the fuel filter and the fuel passage and the fuel filter and jet pump overlap around the outer periphery of the fuel pump along the peripheral direction.

Third Embodiment

Figure 7:
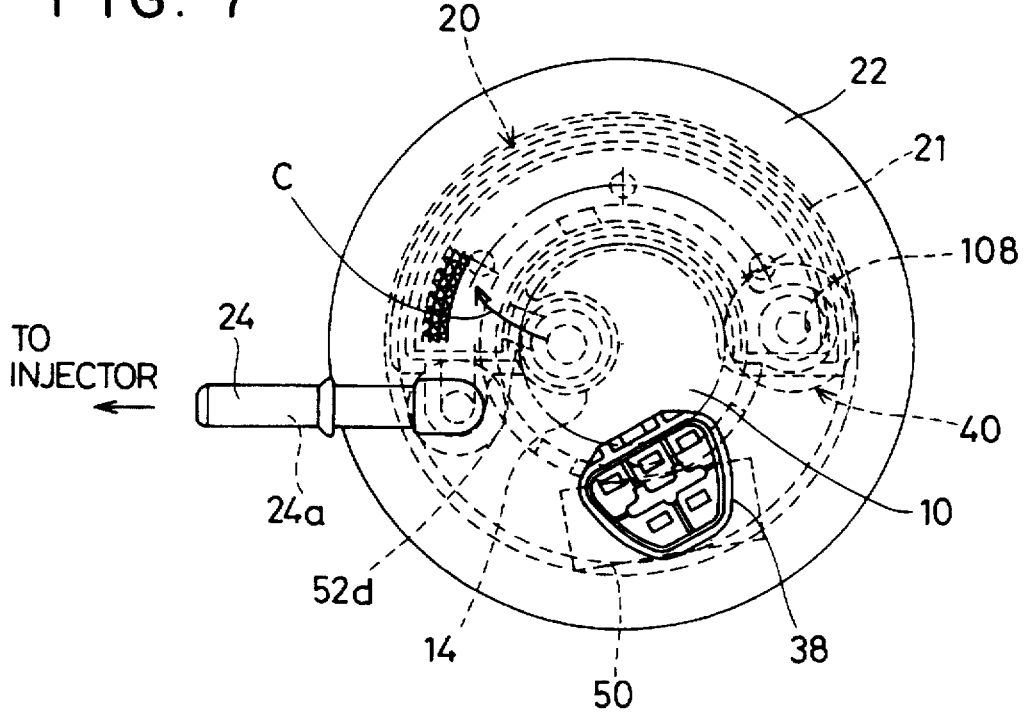
FIG. 7 is a view taken along the arrow VII in FIG. 6.
Figure 6:
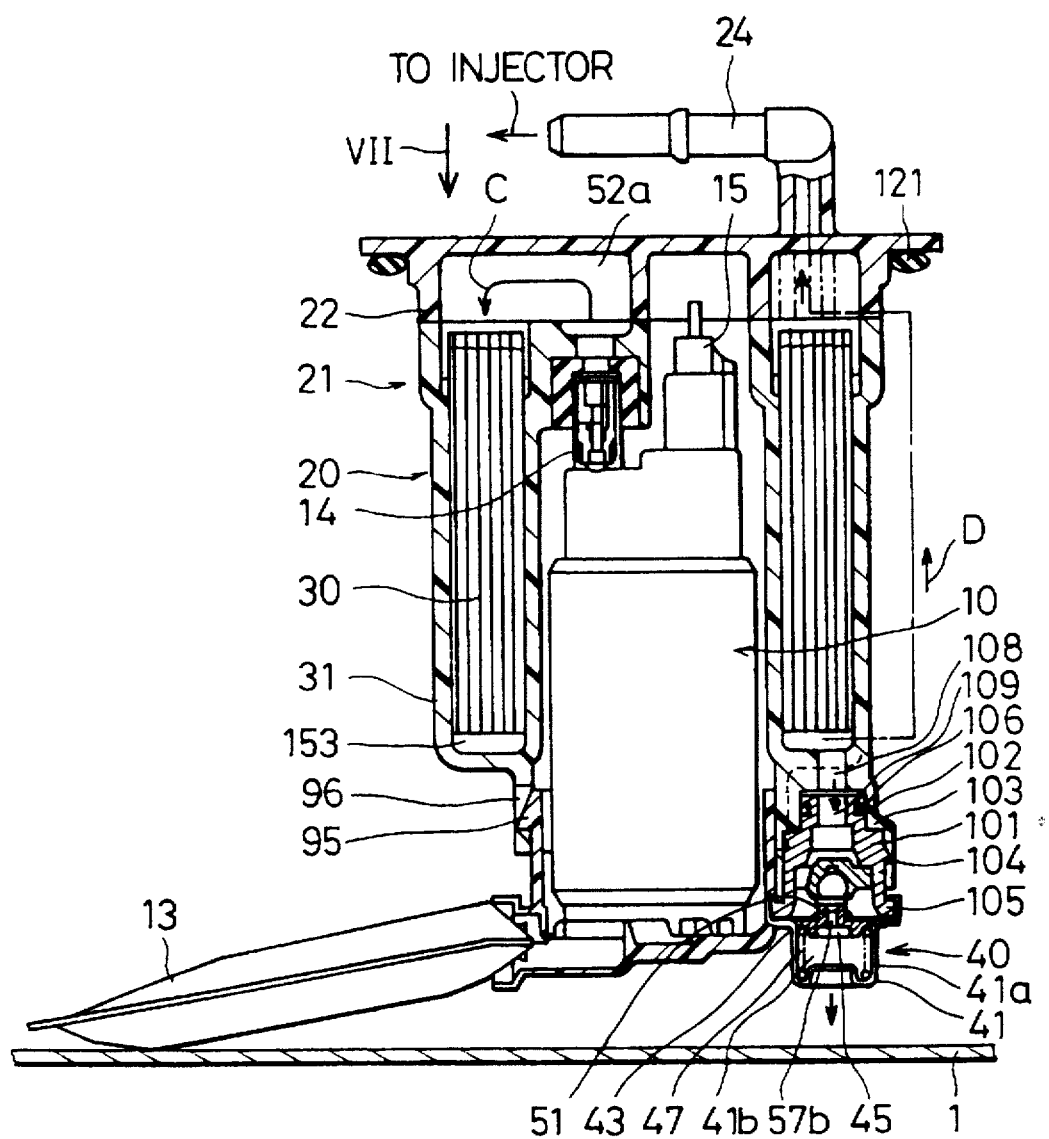
FIG. 6 is a longitudinal cross-sectional view in a third embodiment of the present invention.

FIGS. 6 and 7 show a third embodiment of the present invention.

The third embodiment is an example of a fuel supply system disposing the pressure regulator 40 below the fuel filter contained inside the fuel tank. In the present embodiment also an arc-shaped fuel filter 20, an electric connector 38, a fuel passage, and a fuel level gauge 50 overlap around the outer periphery of the fuel pump 10 along the peripheral direction.

As for the arrangement and disposition of the fuel pump 10, the fuel filter 20, the electric connector 38, the fuel level gauge 50 and the pressure regulator 40, the fuel pump 10 is disposed at the center of the filter case 21. The semi-cylindrical fuel filter 20 is disposed at the outer periphery of this fuel pump 10, and the pressure regulator 40 is disposed in a part of lower annular space of the semi-cylindrical fuel filter 20 around the fuel pump 10 when viewed from the top as shown in FIG. 7.

As for the pressure regulator 40, a body 101 is fitted with a cylindrical portion 102 extending downward to the bottom of the lower case 31 via an O-ring 106. A click (i.e., tongue) 104 of the body 101 is releasably snap fitted into a hole 103 of the cylindrical portion 102 so that the pressure regulator 40 can be easily removed from the filter case 21 by removing the body 101 from the cylindrical portion 102. The edge of the housing 41 is caulked and fixed to a body fixing portion 105 so as to support the outer edge of the diaphragm 43 by the edge of the housing 41 and the body fixing portion 105. The ventilation hole 41a is formed in the housing 41 for setting a pressure in the spring chamber 41b of the housing 41 at the atmospheric pressure or a tank interior pressure. A valve body 51 fixed to the diaphragm 43 is biased toward the seat member 45 by the biasing force of the compressed coil spring 47.

The flow of the fuel is hereinafter explained.

The fuel, sucked by the fuel pump 10 and discharged from the discharging pipe 14 after passing through the filter 13 and the fuel pump suction inlet, flows in the arrow direction C shown in FIGS. 6 and 7, i.e., from the passage 52a inside the upper case 22. After the fuel further flows downward in the filter element 30 to be led to a filter outlet chamber 153 from the passage 52d, a portion of the fuel flows in the arrow direction D through a passage not shown in the Figure, then is supplied to the injector from the discharging passage inside the fuel discharging pipe 24. The residual portion of the fuel returns to the fuel tank 1 as excess fuel accompanied by the pressure adjusting operation of the pressure regulator 40. This excess fuel flows into a passage 108 of the cylindrical portion 102 to be released into the fuel tank 1 via a passage 109 of the body 101, the passage 57b of the valve body 51 and the opening 41a of the housing 41. The pressure inside the filter outlet chamber 153 is adjusted by the pressure regulator 40. When the pressure exceeds a predetermined pressure, excess fuel is discharged from the pressure regulator 40 to the inside of the fuel tank 1.

Thus, various functional parts can be compactly disposed cylindrically and densely in an allowable range of the depth of the fuel tank by utilizing the space around the nearly-filled hollow cylindrical fuel pump 10 and the space below the fuel filter 20.

According to the third embodiment, water accumulated in the filter outlet chamber 153 below the filter element 30 of the lower case 31 of the fuel filter 20 can be discharged into the fuel tank 1 from the outlet passage 57b via the pressure regulator 40, which can prevent water from accumulating in the filter case 21.

Furthermore, in the third embodiment, because the pressure regulator 40 is highly efficiently disposed by utilizing both leeway spaces around the axial center of the fuel pump 10 contained inside the fuel tank 1 and below the semi-cylindrical fuel filter 20, the fuel pump 10, the fuel filter 20 and the pressure regulator 40 can be integrated at a high density and compactly disposed and constructed in a volume having few bumps.

In the above-described embodiments, the cover 22, the lower case 31, and the pump case 12 correspond to holding members composing a holding unit. These members form holding portions for the fuel pump, the fuel filter, the pressure regulator, the fuel level gauge, the electric connector, the fuel passage, and the jet pump.

The embodiments adopt a structural arrangement where the fuel pump body 11 is contained at the inner periphery side of the filter case 21 and the pump case 12 is connected to the filter case 21, so that the filter case 21 can also function as a pump holding part, however, the pump case 12 can be directly connected to the cover 22. The aforementioned embodiments require the connecting portion 29 of the case 21 to be rigid enough to endure the weight of the pump, however, in this case, a load imposed on the welded portion of the case 21 can be reduced by directly connecting the pump case 12 to the cover 22.

Although the filter case 21 is annularly molded and forms a containing portion in the cross-sectional shape of a letter C for containing the element within a certain angular range the filter case 21 can be constructed having only a containing portion in the cross-sectional shape of a letter C. In this case, the pump case 12 and the fuel level gauge 50 are supported by disposing a supporting portion on the outer wall of the containing portion having the cross-sectional shape of a letter C.

In the aforementioned embodiments, the annular parts-holding spaces formed around the outer periphery of the fuel pump 11 are divided into plural angular ranges to hold the semi-annular or partially-annular fuel filter as well as the other parts in respective ranges. Therefore the fuel filter is not existent at the non-continuous portion of the fuel filter, which results in a fuel filter having an imperfect annulus. However, the non-continuous portion can be constructed to have a thin fuel filter element. In this case, an annular fuel filter should be disposed to completely surround the outer periphery of the fuel pump to form a concave portion as a non-continuous portion by partially making the thickness of the annular fuel filter thinner to contain the pressure regulator and the other parts or the like in the concave portion. Even in such a construction, the fuel filter and the other parts can also overlap in the peripheral direction around the outer periphery of the fuel pump so as to obtain a highly-integrated system unlike a conventional one.

According to the embodiments, the fuel filter element is shaped in a honeycomb or a corrugated cardboard shape but other shapes can be also employed. For example, conventional shapes used as a fuel filter element can be utilized. For example, a pleat type shape made by folding a sheet of filtering paper in the shape of waves, a chrysanthemum type, a type made by rolling or laminating half-folded filtering paper can be used as a filter element. Furthermore, a sack-shaped filter element also can be employed.

Besides the construction of the above-described embodiments, a sub-tank can be added. In this case, the sub-tank should be held by the cover closing an opening of the fuel tank and the fuel pump should be disposed inside the sub-tank. The fuel filter is placed around the fuel pump. Such parts as the electric connector, the fuel level gauge, the pressure regulator, the fuel pipe or the like are contained in the non-continuous portion formed on the fuel filter.

INDUSTRIALLY APPLICABLE FIELD

According to the above-described present invention, a fuel filter is partially disposed in a range around the outer periphery of a fuel pump and other parts such as a pressure regulator, an electric connector, a fuel level gauge, a jet pump or a fuel passage are disposed in the remaining range so that a highly-integrated fuel supply system can be manufactured.

We claim:

1. A fuel supply system for supplying fuel to a fuel consumption unit, comprising:
   a fuel pump having a cylindrical appearance;
   a fuel filter for filtering the fuel to be delivered to said fuel consumption unit and having a shape corresponding to an outer periphery of said fuel pump;
   other parts forming a part of said fuel supply system, said other parts being separate from said fuel pump and said fuel filter;
   a holding member holding a plurality of parts for said fuel supply system, said holding member holding said fuel pump, holding said fuel filter around the outer periphery of said fuel pump windingly and holding said other parts around the outer periphery of said fuel pump at a position overlapping in the peripheral direction of said fuel pump with respect to said fuel filter.

2. A fuel supply system according to claim 1, wherein:
   said fuel filter is part-annularly formed in a certain angular range having a partially non-continuous portion around the outer periphery of said fuel pump; and
   said other parts are held in said non-continuous portion.

3. A fuel supply system according to claim 1, wherein:
   said other parts include a pressure regulator for adjusting a pressure of the fuel to be delivered to said fuel consumption unit.

4. A fuel supply system according to claim 1, wherein:
   said other parts include a fuel passage.

5. A fuel supply system according to claim 1, wherein:
   said other parts include a jet pump.

6. A fuel supply system according to claim 1, wherein:
   said holding member includes a cover closing an opening of a fuel tank; and
   said fuel pump and said fuel filter are located inside said fuel tank via said cover.

7. A fuel supply system according to claim 6, wherein:
   said other parts include an electric connector passing through said cover for supplying power to said fuel pump.

8. A fuel supply system according to claim 6, wherein:
   said other parts include a fuel level gauge for detecting a fuel level inside said fuel tank.

9. A fuel supply system according to claim 6, wherein:
   said holding member has a containing portion containing a fuel filter element composing said fuel filter; and
   said containing portion is fixed to said cover.

10. A fuel supply system according to claim 6, wherein:
    said holding member includes a pump case supporting said fuel pump relative to said cover.

11. A fuel supply system according to claim 10, wherein:
    said holding member includes a containing portion containing a fuel filter element composing said fuel filter;
    said containing portion is fixed to said cover; and
    said pump case is connected to said containing portion so that said fuel pump can be supported by said cover via said containing portion.

12. A fuel supply system according to claim 1, wherein:
    said holding member is made of resin.

13. A fuel supply system according to claim 6, wherein:
    said holding member has a containing portion in a shape of a letter C in cross-section extending toward the inside of said fuel tank from said cover;
    said fuel filter is contained in said container;
    said fuel pump is located at an inner periphery side of said container; and
    said other parts are located at an opening portion of the letter C of said container.

14. A holding unit of a fuel supply system for holding a plurality of parts of said fuel supply system including a fuel pump and a fuel filter, said holding unit comprising:
    a cylindrical fuel pump holding portion holding said fuel pump; and
    a parts-holding portion around an outer circumference of said fuel pump, wherein
    said parts-holding portion is divided into a first partial annular holding region for holding said fuel filter and a second partial annular holding region adjacent to said first holding region in the circumferential direction for holding other parts, said first and second holding regions being displaced with respect to one another about the outer periphery of said fuel pump.

15. A holding unit of a fuel supply system according to claim 14, wherein:
    a cover portion is provided to close an opening of a fuel tank; and
    said fuel pump holding portion and said parts-holding portion are connected to said cover portion.

16. A holding unit of a fuel supply system according to claim 14, wherein:
    said parts-holding portion includes a fuel level gauge holding portion holding a fuel level gauge as one of said other parts; and
    said fuel level gauge holding portion holds said fuel level gauge in said second holding region.

17. A holding unit of a fuel supply system according to claim 14, wherein:
    said parts-holding portion includes a pressure regulator holding portion holding a pressure regulator as one of said other parts; and
    said pressure regulator holding portion holds said pressure regulator in said second holding region.

18. A holding unit of a fuel supply system according to claim 15, wherein:
    an electric connector is disposed on said cover portion as one of said other parts; and
    said electric connector is held in said second holding region.

19. A fuel supply system according to claim 14, wherein:
    said other parts include a member forming a fuel passage; and
    said fuel passage member is held in said second holding region.

20. A fuel supply system according to claim 14, wherein:

said other parts include a jet pump; and said jet pump is held in said second holding region.

21. A holding unit of a fuel supply system for holding a plurality of parts of said fuel supply system including a fuel pump and a fuel filter, said holding unit comprising:

a cylindrical fuel pump holding portion holding said fuel pump; and a parts-holding portion disposed on an outer circumference of said fuel pump, wherein said parts-holding portion is divided into: (a) a first holding region disposed in an outer circumferential direction of said fuel pump for holding said fuel filter, and (b) a second holding region also disposed in said outer circumferential direction and overlapping the first holding region, for holding other parts.

22. A fuel supply system according to claim 21, wherein said first holding region and said second holding region are radially equidistant from said pump holding portion, but at different respective axial positions for at least said overlapped portions of the holding regions.

23. A holding unit of a fuel supply system for holding a plurality of parts of said fuel supply system including a fuel pump and a fuel filter, said holding unit comprising:

a cylindrical fuel pump holding portion holding said fuel pump; and a parts-holding portion disposed at an outer periphery of said fuel pump;

the parts-holding portion having an annular ring shape divided into a first holding region having a C-shaped cross section and a second holding region having a cross-sectional shape spanning a gap left between ends of said C-shaped cross section.

24. A holding unit of a fuel supply system for holding a plurality of parts of said fuel supply system including a fuel pump and a fuel filter, said holding unit comprising:

a cylindrical fuel pump holding portion holding said fuel pump; and a parts-holding portion disposed at an outer periphery of said fuel pump;

said parts-holding portion being divided into a first holding region disposed in a peripheral circumferential direction for holding said fuel filter and a second holding region disposed adjacent to said first holding region in the peripheral circumferential direction for holding other parts; and each of said first and second holding regions having surfaces respectively defined by said pump holding portion and said parts-holding portion.

* * * * *